May 30, 1950     B. J. GRASBERGER     2,509,915
SPOON MAKING MACHINE

Filed Sept. 25, 1946     2 Sheets-Sheet 1

INVENTOR
BENEDICT J. GRASBERGER

BY *[signature]*

ATTORNEY

May 30, 1950  B. J. GRASBERGER  2,509,915
SPOON MAKING MACHINE
Filed Sept. 25, 1946  2 Sheets-Sheet 2

INVENTOR
BENEDICT J. GRASBERGER

BY *Gardner J. O'Boyle*

ATTORNEY

Patented May 30, 1950

2,509,915

UNITED STATES PATENT OFFICE 2,509,915

SPOONMAKING MACHINE

Benedict J. Grasberger, Bumpass, Va.

Application September 25, 1946, Serial No. 699,181

2 Claims. (Cl. 144—2)

My invention relates to spoon making machines and more particularly to a machine for making wooden spoons for ice cream and the like.

It has heretofore been suggested to make wooden spoons by pressing, stamping or otherwise forming a spoon from thin strips of material, such as veneer. It has also been proposed to form spoons from individual wood blocks by cutting and trimming the block, and thereafterwards shaping the spoon elements in a conventional wood-working machine.

While the prior art arrangements are satisfactory to the extent that they perform the functions for which they were designed, the proposed spoon making devices, of which I am aware, are open to several objections, which are, inherent in their construction and arrangement. It is difficult to bend or press veneer to desired spoon shape and a spoon so formed frequently loses shape after it has been packed and dries out. Making spoons from individual blocks entails considerable waste of material and necessitates use of a plurality of machines to perform the cutting, trimming, and shaping operations.

After considerable research and experimentation, I have found that spoons can be advantageously made from solid timber, the cutting and trimming operations being performed by one machine, comprising a minimum of operating parts.

The improved spoon making machine of the present invention comprises essentially a rotatable spoon cutter, a rotatable trimmer knife and a feed device for advancing a solid block of wood to cutting and trimming positions with respect to the cutter and trimmer knives. The shafts to which the knives are attached are constructed and arranged so that upon rotation of the cutter shaft, the block is advanced horizontally a predetermined distance into cutting position. The cutter then scoops or cuts a complete spoon from the face of the wood block and thereafterwards the face of the block is trimmed off by the trimming knife, whereby a spoon of uniform shape and thickness is formed, upon each revolution of the shaft to which the spoon cutter is attached.

An object of my invention is to provide an improved machine for making wooden spoons.

Another object of my invention is to provide an improved spoon making machine wherein the spoons are cut or scooped from a solid block of wood.

Yet another object of my invention is to provide a spoon making machine having an improved spoon cutting knife constructed and arranged to scoop a complete spoon from a solid block of the material from which the spoon is formed.

Still another object of my invention is to provide an improved machine for making wooden spoons, having means for ejecting a spoon from the cutter, after the spoon has been scooped from the block of wood, from which it is formed.

A further object of my invention is to provide a spoon making machine having an improved support and feed arrangement for the solid block of material from which the spoons are formed.

Yet another object of my invention is to provide an improved machine for making wooden spoons, wherein the cutting, trimming, and feed of material are correlated in timed sequence so that upon each revolution of the cutter shaft, a complete spoon is formed.

A still further object of my invention is to provide an improved spoon cutting machine which is strong and sturdy in construction, consisting of but few parts and not likely to get out of order even after long and continued use.

With these and other objects in view, which may be incident to my improvements, the invention consists in the parts and combinations to be hereinafter set forth and claimed, with the understanding that the several necessary elements, comprising my invention, may be varied in construction, proportions and arrangement, without departing from the spirit and scope of the appended claims.

In order to make my invention more clearly understood, I have shown in the accompanying drawing means for carrying the same into practical effect, without limiting the improvements in their useful applications to the particular constructions, which for the purpose of explanation, have been made the subject of illustration.

7, showing the front face of a wooden block; and

Figure 9:

Fig. 9 is a perspective view of a wooden spoon.

Figure 1:
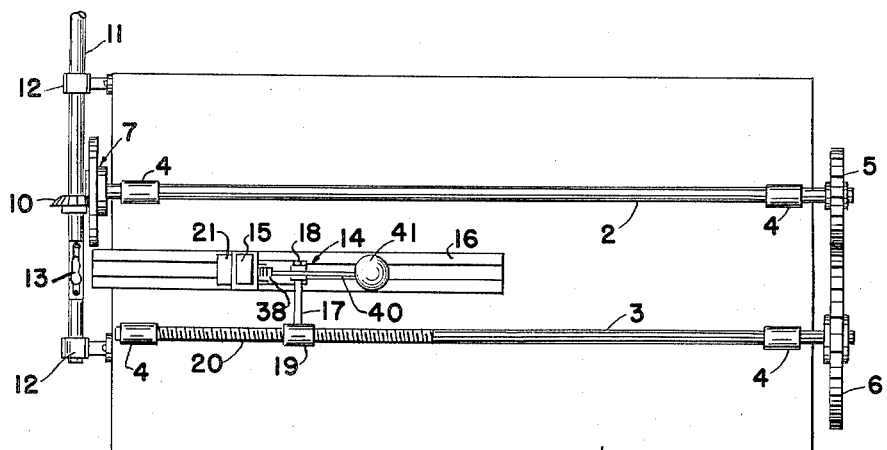
Figure 1 is a plan view of my improved spoon making machine.
Figure 2:
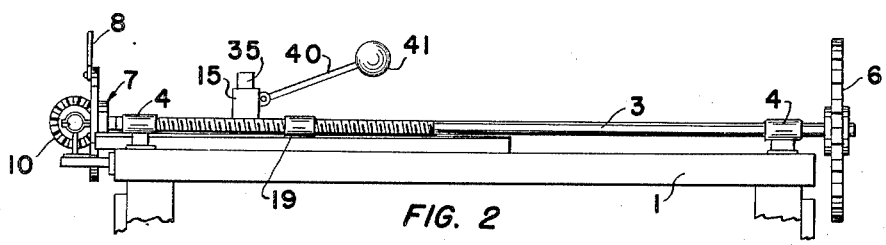
Fig. 2 is a side elevational view of the machine shown in Fig. 1.
Figure 3:
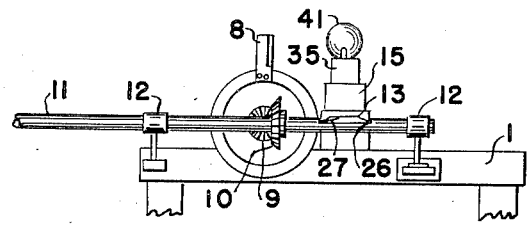
Fig. 3 is a front elevational view of the machine, showing the arrangement of the cutting and trimming knives.

Referring to the drawings, and more particularly to Fig. 1, the improved spoon making machine of the present invention comprises a base 1, having a pair of parallel shafts 2 and 3 rotatably supported thereon, in suitable bearing members 4, the shafts being geared together by means of gears 5 and 6. Mounted upon shaft 2, in the vicinity of the end at the front of the machine, is a trimming knife support, designated generally by numeral 7, having a trimming knife 8 (Figs. 2 and 3) attached thereto. As will be seen in Fig. 3 a gear 9, keyed or otherwise attached to shaft 2, is adapted to mesh with a spur gear 10 mounted upon a shaft 11, the axis of which lies in a plane perpendicular to the plane of the axes of shafts 2 and 3. Shaft 11 which is rotatably supported in bearings 12, forms a support for a spoon cutter knife 13, the shaft being adapted to be driven by a source of power not shown.

In the operation of the machine, so far described, it will be noted that upon rotation of shaft 11, in the direction indicated (Fig. 3), shaft 2, together with the spoon cutter 13, the trimming knife support 7, and trimming knife 8 are rotated through the medium of gears 9 and 10; shaft 3 is also caused to rotate by means of the gears 5 and 6, when the main drive shaft 2, is rotated.

Referring again to Fig. 1, a spoon material feed device, designated generally by numeral 14, is positioned upon base 1, between the parallel shafts 2 and 3. The feed device comprises a slidable chuck 15, adapted to slide in suitable trackway or guide 16, movement of the chuck lengthwise of the base 1, being effected through arm 17 having one end 18 connected to the base of the chuck support, and the other end attached to a threaded sleeve 19, adapted to engage with the thread portion 20 of the feed shaft 3.

The material from which spoons are to be formed comprises a solid block of wood 21, adapted to be clamped in the chuck member 15, and moved forwardly to cutting and trimming positions with respect to the cutter knife 13, and trimming knife 8, by means of the feed device 14. It will be understood the block 21 is initially of greater length than shown, that is to say, it may be of approximately the same length as the working face of the slide or trackway 16. When power is applied to shaft 11, causing it to rotate, together with shafts 2 and 3, the block 21 is fed forwardly a predetermined distance, each revolution of the feed shaft 3.

Figure 4:
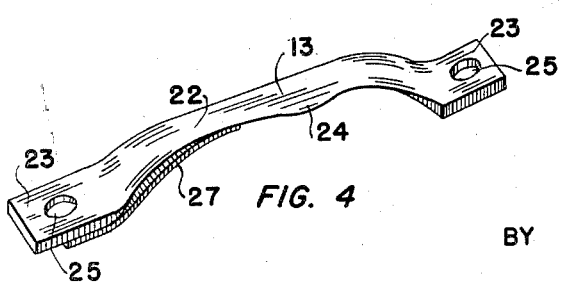
Fig. 4 is a perspective view of the spoon cutter.

As will be seen in Fig. 4, the spoon cutter knife 13, is formed with an angularly offset body portion 22, intermediate its ends 23, the cutting face 24 thereof being of spoon shaped configuration. The ends of 23 are formed with openings 25 adapted to receive bolts or other suitable means to fasten the blade to its support shaft 11. In this connection, it will be noted that shaft 11 (Fig. 3) is recessed as at 26, to receive the ends of the cutter blade, whereby the body portion of the blade, due to the offset arrangement, is spaced from the bottom of the recess formed in the blade support shaft 11. Attached to one end of cutter blade 13, and extending to a point substantially at the center of the blade, is a spring member 27, adapted to eject a spoon from contact with the blade, after the spoon has been scooped from the spoon forming block 21.

Assuming that the machine is operating, and block 21 has been advanced so that the front face 28 (Figs. 7 and 8) is in spoon cutting position, with respect to cutter blade 13, as the cutting edge of the blade moves forwardly and downwardly of the face of the block, a complete spoon is scooped therefrom. During the downward movement of the blade, ejector member 27 contacts the edge of the spoon, and when the cut has been completed, the spoon is ejected from contact with the cutter, into a suitable container, not shown. After a spoon has been cut, the trimming knife 8 sweeps across the face of the block and trims the same, preparatory to another cut, by the spoon cutter. The purpose of trimming the block after each cut is to maintain uniform thickness of material, that is, the spoons will be of uniform shape.

It will be appreciated that the feed device, and the cutting and trimming operations are so correlated that immediately after a spoon has been scooped from the block, the face of the block is trimmed and advanced to cutting position. The design of the gears between the drive and driven shafts of the machine, together with the block feeding device, is such that the cutting, trimming, and feeding operations are performed in timed sequence. The machine is rugged in construction, consists of but few parts, and is not likely to get out of order even after long and continued use. Wooden spoons may be quickly and economically made with the machine of the present invention; the machine is entirely automatic and requires little supervision, other than inserting a block of timber in the chuck member of the feed device. The present invention comprehends the provision of a suitable cut-out or stop device, associated with the feed mechanism whereby the feed of material may be automatically stopped, in event that defective material is encountered, or from other causes, during the operation of the machine.

Figure 5:
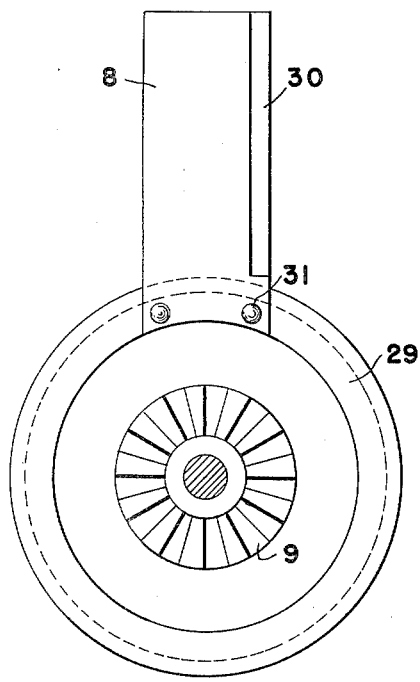
Fig. 5 is a front elevational view of the trimming knife support.
Figure 6:
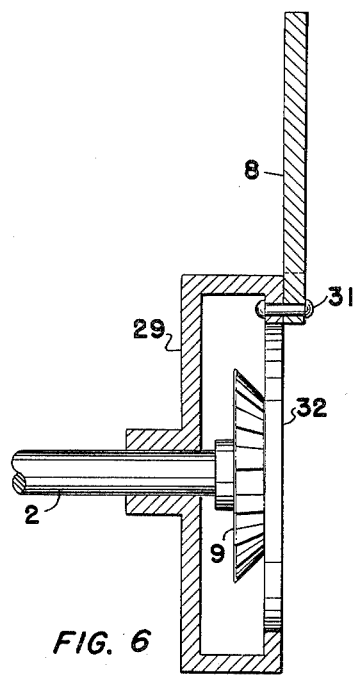
Fig. 6 is a sectional view of the trimming knife support shown in Fig. 5.

Referring to Figs. 5 and 6, the trimming blade support comprises a cylindrical shaped housing 29, having trimming blade 8, formed with cutting edge 30, attached in the vicinity of the peripheral edge of the housing by means of rivets or bolts 31. One face of the housing is formed with an opening 32 to receive a portion of mitre gear 10 and permit it to engage with gear 9, positioned within the housing.

Figure 7:
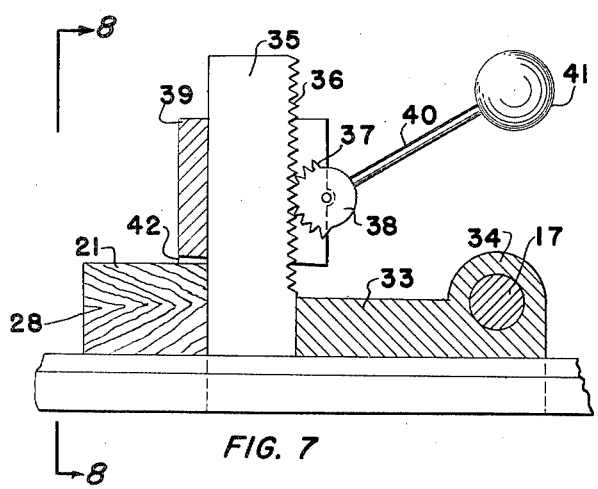
Fig. 7 is a side elevational view, partly in section, of the chuck associated with the feed means, adapted to receive the woodblock from which spoons are formed.

Referring to Fig. 7, the chuck member associated with the feed device comprises a base 33, having an enlarged portion 34, adapted to receive one end of arm 17, the other end of the arm being attached to sleeve 19, which is in threaded engagement with feed shaft 3. The vertical portion 35 of the chuck is formed with teeth 36 adapted for engagement with the toothed arcuate portion 37 of member 38 pivotally mounted upon a slide 39, which surrounds the vertical member 35. Attached to member 38 is an operating arm 40, having a weight 41 at its free end. The lower face of the slide may be formed with a roughened or toothed surface 42 (Fig. 8), to provide a firm grip between the slide and the block 21.

Figure 8:
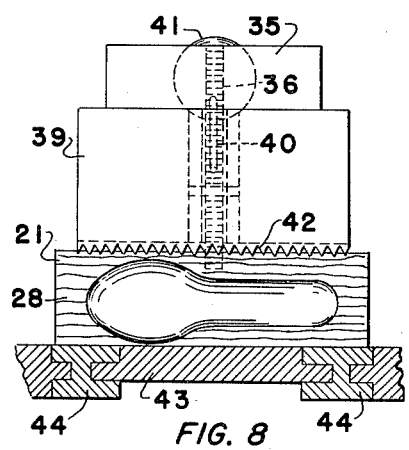
Fig. 8 is a sectional view along line 8—8 of Fig.

When it is desired to position a block in the chuck, arm 40 is moved upwardly to raise the clamp 39 a sufficient height to accommodate the block. After the end of the block is inserted beneath the clamp, arm 40 is released and the moment of weight 41 about its fulcrum point forces the clamp 39, downwardly into tight engagement with the block, and holding the block securely in desired feeding position. As shown in Fig. 8, the base of chuck 43 may be constructed and arranged to slide in guide members 44, comprising part of the guide or trackway 16.

It will thus be seen that by means of the machine of the present invention a complete spoon is scooped from the spoon forming material, upon each revolution of the spoon cutter. In the operation of the machine, the block is advanced to cutting position, the cutter scoops a complete spoon from the face of the block, and the spoon is ejected from contact with the cutter, into a suitable container. After the spoon has been cut, the trimming knife trims the face of the block, preparatory to another cut, by the spoon cutter.

While I have shown and described the preferred embodiment of my invention, I wish it to be understood that I do not confine myself to the precise details of construction herein set forth, by way of illustration, as it is apparent that many changes and variations may be made therein, by those that are skilled in the art, without departing from the spirit of the invention, or exceeding the scope of the appended claims.

I claim:

1. In a spoon making machine of the character described, a rotatable spoon cutter support, a spoon cutter attached to said support, comprising an angularly off-set blade having a cutting face of spoon-shaped configuration, means associated with said blade for ejecting a spoon therefrom after the spoon has been cut from the spoon forming material, comprising a spring strip having one end attached to the inner face of the cutter knife in the vicinity of the point of attachment of the cutter to its support, said strip extending along the inner face of the cutter knife, the free end of the strip terminating intermediate of the ends of the cutter, a rotatable trimming knife support, a trimming knife attached to said support, the trimming knife support being adapted to rotate in a plane perpendicular to the plane of the spoon cutter support, means to feed material from which spoons are to be formed to cutting and trimming positions, with respect to said cutter and trimmer, and a source of power operatively connected with the material feed means and with the cutter and trimmer supports to simultaneously feed the material and rotate the trimmer and cutter supports.

2. In a machine for making scooped wooden spoons, a base, a pair of geared parallel shafts rotatably mounted upon said base, a slidable support for a solid block of wood positioned between the parallel shafts, a shaft rotatably mounted at one end of the base and having a spoon cutter attached thereto, comprising an angularly off-set blade having a cutting face of spoon-shaped configuration, the axis of the cutter shaft being perpendicular to the plane of the axes of the parallel shafts, means associated with the angularly off-set blade for ejecting a spoon therefrom after the spoon has been cut from the block of wood, comprising a spring strip having one end attached to the inner face of the cutter knife in the vicinity of the point of attachment of the cutter to its support, said strip extending along the inner face of the cutter knife, the free end of the strip terminating intermediate of the ends of the cutter, a trimming knife support attached to the end of one of the parallel shafts, a trimming knife mounted upon said support, the other of said parallel shafts being operatively connected to the slidable support for the wooden block, whereby upon rotation of the shaft to which the trimming knife support is attached, the block is advanced to cutting and trimming positions, with respect to said cutter and trimmer knives, and a source of power operatively connected with the cutter shaft and with the shaft to which the trimmer knife support is attached, to rotate the cutter and trimmer supports.

BENEDICT J. GRASBERGER.

REFERENCES CITED

The following references are of record in the file of this patent:

UNITED STATES PATENTS

| Number | Name | Date |
|---|---|---|
| 315,509 | Johnson | Apr. 14, 1885 |
| 410,299 | Spofford | Sept. 3, 1889 |
| 497,932 | Tinkham | May 23, 1893 |
| 657,817 | Ensign | Sept. 11, 1900 |
| 1,957,623 | Walter | May 8, 1934 |
| 2,001,512 | Walter | May 14, 1935 |